(12) United States Patent
Gabay et al.

(10) Patent No.: US 8,192,204 B1
(45) Date of Patent: Jun. 5, 2012

(54) WORKBOOK WITH MOVABLE COLORED CLIPS

(76) Inventors: Eleonora Gabay, Helmetta, NJ (US); Natan Kogan, Helmetta, NJ (US)

(*) Notice: Subject to any disclaimer, the term of this patent is extended or adjusted under 35 U.S.C. 154(b) by 1345 days.

(21) Appl. No.: 11/639,805

(22) Filed: Dec. 16, 2006

Related U.S. Application Data

(60) Provisional application No. 60/751,669, filed on Dec. 19, 2005.

(51) Int. Cl.
G09B 3/00 (2006.01)

(52) U.S. Cl. .................................. 434/322; 434/363

(58) Field of Classification Search .............. 434/317, 434/334, 322, 353, 361, 363, 364, 407; 24/455; 116/237–239; 281/29
See application file for complete search history.

(56) References Cited

U.S. PATENT DOCUMENTS

| | | | |
|---|---|---|---|
| 3,496,653 A | 2/1970 | Wolfner | |
| 4,228,597 A * | 10/1980 | Albenda | 434/339 |
| 4,702,700 A | 10/1987 | Taylor | |
| 4,832,605 A | 5/1989 | Bragin | |
| 5,066,234 A * | 11/1991 | LeDesma | 434/205 |
| 5,167,505 A * | 12/1992 | Walsh | 434/205 |
| 5,447,439 A | 9/1995 | Nathanson | |
| 5,765,873 A * | 6/1998 | Chen | 281/45 |
| 5,820,383 A | 10/1998 | Levins | |
| 6,402,522 B1 | 6/2002 | Gabay | |
| 6,988,462 B1 * | 1/2006 | Zhu | 116/306 |

FOREIGN PATENT DOCUMENTS

WO  WO 02/069303  9/2002

OTHER PUBLICATIONS

Sylvia Rimm, on-line Questions and Answers by Dr. Sylvia Rimm. www.wholefamily.com/aboutourkids/sylvia_rimm_qa/pencil_anxeiety.html, © 2000, Creators Syndicate, Inc.

Gale Encyclopedia of Psychology. Fine Motor Skills; Gale Group, 2nd.ed., 2001, www.findarticles.com/p/articles/mi_g2699/is_0004ai_2699000469/p_2.

Giant Basic Skills, K-1 workbook, Modern Publishing, a Division of Unisystems, Inc., 2002, Homeworkbook, Carson-Dellosa Publishing Company, Inc. 2002.

Beginning Phonics, 1997, pp. 64-72, Fisher-Price, Inc.

Irene Daria-Wiener, on-line article "10 Signs of a Great Preschool," www.parents.com/parents/story.jhtml?storyid=/templatedata/parents/story/data/3232.xml , 2004.

Jean Tepperman, On-line article: "School readiness" www.4children.org/news/900ready.htm, Sep.-Oct. 2000 issue of the "Children's Advocate" newsmagazine.

* cited by examiner

*Primary Examiner* — Xuan Thai
*Assistant Examiner* — Peter Egloff

(57) ABSTRACT

An educational workbook for very young children of pre-school and kindergarten age, as well as children who are somewhat older but do not have developed fine motor skills, which extends the advantages of U.S. Pat. No. 6,402,522 having a hand-held booklet containing a series of problems with color-coded selectable answers and flat answer card having movable colored clips and compatible to the booklet. The answer card is typically enclosed in the booklet and can serve as a bookmark. Children record their answers by placing the selected colored clips into the corresponding positions on the answer card. Children check their own work by comparing site-by-site the colors of the clips on their answer with the colors of the child-friendly images on the corresponding answer key. No pencil is used, answer keys are easily readable, and exercises can be repeated many times since there is no trace of earlier responses. Additionally, students' answer cards and answer key card may be stacked together and create a color display of class or group understanding encouraging group cooperation and teamwork.

7 Claims, 4 Drawing Sheets

WORKBOOK WITH MOVABLE COLORED CLIPS

CROSS-REFERENCE TO RELATED APPLICATIONS

This application claims the benefit of U.S. Provisional Application No. 60/751,669 filed Dec. 19, 2005.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING APPENDIX

Not Applicable

BACKGROUND OF THE INVENTION

This invention is an improvement over our U.S. Pat. No. 6,402,522, the disclosure of which is incorporated herein by reference. This invention extends the advantages of U.S. Pat. No. 6,402,522 by providing an educational device especially suitable for very young children, such as children of about 3 to 5 years of age, that is those of preschool and kindergarten age, as well as children who are somewhat older but do not have developed fine motor skills, typically about 6 to 8 years of age, but possibly older.

The present invention relates generally to educational devices, more particularly to book-like educational devices such as hands-on workbooks, which permit preschool and kindergarten children to practice in a wide range of basic skills in a way that promotes a sense of self-confidence and joy.

Workbooks are well known in the educational field. A wide variety of workbooks have been developed to aid in teaching very young children fundamentals such as colors, shapes, numbers, and letters. Such workbooks are valuable instructional tools because they provide a diversity of formats and because exercises are typically sequenced from easiest to most difficult so that children can learn more easily and their progress can more readily monitored.

However, the conventional Pre-K workbooks, which employ the pencil as a traditional recording tool, have important limitations. The following will explain this statement in detail:

Preschoolers and some kindergartners often have not yet developed the fine motor skills necessary to use writing tools (such as pencils and crayons) to craft legible matching lines, circles, cross signs or color the pictures. In addition, some children erase frequently, causing their papers to become messy. When their papers are messy, children do not have a feeling of satisfaction because they do not receive a clear picture of their accomplishments. As a result, children try to avoid practicing learning skills. Dr. Sylvia Rimm, PhD, psychologist and a clinical professor of psychiatry and pediatrics at Case Reserve University School of Medicine, calls this problem as a "pencil anxiety." She wrote: "The physical act of writing simply slows some children down and causes them to lose confidence in their abilities". (On-line Questions Answered by Dr. Sylvia Rimm. http://www.wholefamily.com/aboutourkids/sylvia_rimm_qa/pencil_anxe=iety.html]). For this reason many educators suggest parents choose preschools with non-paper-and-pencil curriculum.

b) Although exercises in the conventional workbooks are generally enriched by fun drawings and interesting formats, many children find them boring. Young children, especially preschoolers and kindergartners, are reality-oriented learners. They succeed in concentrating, performing, and learning when the task allows them to be immersed in the task physically as well as mentally. They rather prefer to do something (sort, place, match, insert, and so on) rather than writing. Preschoolers benefit from experiences that support the development of fine motor skills in the hands and fingers. Accordingly, it is recommended that children have strength and dexterity in their hands and fingers before being asked to manipulate a pencil on paper. Gale Encyclopedia of Psychology: Fine motor skills states, Gale Group, $2^{nd}$ edition, 2001: "Development of fine motor skills plays a crucial role in school readiness and cognitive development." www.findarticles.com/p/articles/mi_g2699/is_0004/ai_2699000469/p_2 c) Conventional Pre-K workbooks do not develop children's self-checking and self-correcting habits, which are essential for building a success pattern. The checking mechanisms of some workbooks simply do not exist. For example, *Giant Basic Skills, K-1 workbook, Modern Publishing, A Division of Unisystems, Inc.*, 2002, *Homeworkbooks, Carson-Dellosa Publishing Company, Inc.*, 2002, doesn't have the answer key pages. Some workbooks have the intimidating format of the answer keys, which is appropriate for adult supervisors only and not for young children. For example, the answer key pages of the kindergarten workbook *Beginning Phonics*, 1997, pp. 64-72, Fisher-Price Inc., are presented in a reduced, two-dimensional, busy format. These formats repeat the exercises themselves with pluralities of pictures and additionally contain either matching lines, or circles, or shades, or colors. Children with poor discrimination skills are essentially unable to apprehend distantly differences between their answers and the answers provided on such keys.

d) All children like to demonstrate their correct results to others and be rewarded immediately. Barbara Willer, Ph.D., deputy executive director of the National Association for the Education of young Children (NAEYC) has stated "the overarching goal of any preschool should be to help a child feel good about himself as a learner and to feel comfortable in a school-like setting." (Irene Daria-Wiener, On-line article "10 Signs of a Great Preschool" http://www.parents.com/parents/story.jhtml?storyid=/templatedata/parents/story/data/3232.xml).
The paper-and-pencil workbooks do not provide this opportunity to children. They do not have a self-corrective feature and they do not provide a visual and at-a-glance recognizable result.

e) All young children like to learn through play. Especially they like kid-friendly images and win-like situations. Dr. Sue Bredekamp, early education expert of the National Association for the Education of Young Children (NAEYC), stated: "Three- and four-year-olds are very active. Play is children's natural mode for learning." (Jean Tepperman, On-line article: School readiness.") http://www.4children.org/news/900ready.htm Although the conventional Pre-K workbooks have plenty of kid-friendly images, they do not give children the feeling that it is a game and that they can be winners in this game.

f) Children, and especially children with memory problems, need to repeat exercises many times in order to acquire a particular skill. However, exercises in conventional workbooks that use a pencil can be used only once. Practically these books cannot be reused, because after the initial use, the answers remain in place for the user.

g) Teachers spend a great deal of time checking children's written answers. This procedure is inefficient and too time consuming, especially for large class instruction as well as when grading even smaller groups of preschoolers and kindergarteners. As a result the teacher is not able to have sufficient time to provide guidance and prompts for the slow learners.

h) Good programs in preschools, childcare centers, and kindergartens prepare children not only academically, but also teach them to act as team members. Conventional workbooks do not give the teacher the opportunity to create a team. Rather, each works independently and lacks the advantages of peer tutoring and cooperation. With conventional workbooks it is impossible to have a visual picture of the whole group results.

Therefore, a long-standing need has existed to provide preschoolers and kindergartners with alternative workbooks, which permit very young children to record their answers without having to use a pencil. These workbooks should develop children's self-checking and self-correcting habits, providing the easy-to-check answer keys and self-corrective feature. Using these workbooks children should be immersed in a fun easy-to-manipulate hands-on activity, which will give them a feeling of a game and that they are winners in this game. Also these workbooks should permit children to repeat exercises again and again.

Further, there is a continuing need to provide a teacher with an instructional tool that saves time by giving the teacher the opportunity to rapidly, at a glance check students' works.

Moreover, there is a need to provide a teacher with an instructional tool that gives the opportunity to create a cooperative atmosphere in the classroom through peer tutoring and by giving children the visual picture how well the group works as a team.

The workbook disclosed in our prior U.S. Pat. No. 6,402,522 contains hand-held booklet with series of problems with color-coded selectable answers and a flat answer card having movable colored tabs. Children record their answers by inserting the selected colored tabs into the corresponding holes on the answer card. Children can check their own work by comparing site-by-site the colors of the tabs with the colors on the answer key. No pencil is used, answer keys are easily readable, and exercises can be repeated many times since there is no trace of earlier responses.

The answer card of our prior patent with punched holes and colored movable flexible tabs inserted into the holes provides the following advantages:

1) The answer card is flat and compatible with a book format. This card is enclosed essentially as a bookmark. This feature allows keeping the usual format of a workbook and provides convenience in operating and storing.

2) The holes/tabs design provides the exact tabs fixation on the answer card. This feature is necessary for the site-by-site self-checking procedure.

3) The tab creates a sufficient colored spot, which is also needed for comparing the colors of the tabs with the colors on the answer key.

4) The card is self-contained. The movable colored tabs in storing position are inserted in the holes of the answer card. In this manner, they cannot be misplaced and no additional storing device is needed.

5) The plastic flexible tabs are not consumable and can be used as many times as needed. It is very important feature that there is a single answer card for all exercises of the book and thereby giving children an opportunity to repeat exercises again and again.

Experience and testing has shown, that the manipulating activity with movable colored tabs is enjoyable and fun for those students who have sufficient finger dexterity to easily take off and to insert the tabs in the holes of the answer card. This activity is similar to lacing activity intended for children 5 years old and up.

However, for preschoolers and kindergartners (3-5 years old), and for older children with poor fine motor skills, this task (taking off and inserting tabs in the holes) is difficult and therefore not pleasant. Gale Encyclopedia of Psychology, Fine Motor Skills, $2^{nd}$ ed. Gale Group, 2001 states: "The central nervous system (of preschoolers) is still in the process of maturing sufficiently for complex messages from the brain to get to the child's fingers. Only by the age of five (kindergartners), most children have advanced beyond the fine motor skill development of the preschool age." www.findarticles.com/p/articles/mi_g2699/is_0004/ai_2699000469/p_2

Also, there is considerable variation in fine motor development among the preschool age group of children. This is why some children would insert tabs in the holes of the answer card very quickly, while some children are able to accomplish this task only with help of supervisor. This means that the teacher has to given attention to those children and therefore he/she does not have the opportunity to effectively provide a group instruction.

Also, the workbooks with movable colored tabs do not provide children with kids-friendly images, which are important elements of play and reliable agents for reinforcements. These images add an element of excitement to the monotony of repetition.

A variety of books are currently on the market that is provided with manipulative pieces for use with book. Some children's books have had magnetic pieces or stickers that can be applied to the pages to complete a missing part of either a pictorial or verbal story (U.S. Pat. No. 5,820,383 to Levins, U.S. Pat. No. 3,496,653 to Wolfner, U.S. Pat. No. 4,702,700 to Taylor, U.S. Pat. No. 5,447,439 to Nathanson, U.S. Pat. No. 4,832,605 to Bragin).

Patent No. WO02069303 to Kruger discloses an activity book with set of three-dimensional objects that are attachable to the pages of the book. These three-dimensional work pieces are belts, buttons, curtain hooks, curtain rings, necklaces, a chain with a lock and key, leather strips, paper clips, pipe cleaners, ribbons, elastic bands, shoe laces, string, or zip fasteners. Different work pieces are intended to complete different activities. Each page describes some specific activity, which has to be completed by children.

Although the prior art devices may be generally satisfactory for their intended purposes, they are not satisfactory to extend the workbook of U.S. Pat. No. 6,402,522 for successful use by preschool and kindergarten age children.

It is apparent an improvement over our U.S. Pat. No. 6,402,522 that for preschool and kindergarten age children and for children with poor fine motor skills there is need for allowing these children to easily manipulate flat colored work pieces on the answer card and provide an exact fixation of these work pieces in the storing and answering positions on the answer card. The work pieces, being not consumable, are of a size sufficient to compare colors. The self-checking and self-corrective features could be strengthened by child-friendly images, which appear at the moment of comparing correctness of answers.

BRIEF SUMMARY OF THE INVENTION

The present invention is a "hands-on", self-checkable, self-corrective, easy-to-manipulate, reusable, not consumable, self-contained, game-like workbook for very young children and children with poor fine motor skills. It instructs children in fundamentals such as colors, shapes, numbers, letters, and words using exercises that can be grouped by topic and that are progressively sequenced from easiest to more difficult. It also gives the teacher a time-saving tool for assessing student performance and encourages group cooperation.

The workbook has two principal parts:
A booklet containing the exercises with answer keys and an answer card with colored movable clips.

Because it is established that very young children should have strength and dexterity in their hands and fingers before being asked to use a pencil, one object of the invention is to provide an educational device, more particularly, an alternative workbook for such children which permits them to record answers by means that does not involve use of pencil.

It is another object of the invention to provide a workbook that permits children to record their answers in a way that uses color since color is an immediately recognizable signal.

It is another object of the invention to provide a workbook that permits children to record their answers on the separate flat answer card, which is compatible with a book format and is enclosed essentially as a bookmark. This feature allows keeping the usual format of a workbook and provides convenience in operating and storing.

It is another object of the invention to provide a workbook that permits children to record their answers by operating with colored clips on the rigid answer card. These clips have large sized colored spots, are flat, so as to easily slide on the answer card surface, and can be at least partially visible above the top edge of the card.

It is another object of the invention to provide a workbook that permits children to precisely fixated the colored clips on the determined positions of the answer card.

It is another object of the invention to provide a workbook that gives children a clear, well-organized and extremely easy way to record and check answers. This is achieved by using color-coded selectable answers, linear (one-dimensional) arrangement of colored clips on the answer card, and by using a well-structured color-coded clearly recognizable answer key. This permits children to check the result of each problem simply by comparing side-by-side the color on the answer card with the color on the answer key. Practically, the color-coded answer key works as a color stencil. The coincidence of colors is rewarding for children and they receive an immediate feedback with a great feeling of success, which is very important for building self-esteem from the first steps of learning.

It is yet another object of the invention to provide a workbook, which permits children to correct their work by themselves and without traces of mistakes. This is achieved by the simple procedure of changing the incorrect colored clip for correct one.

It is yet another object of the invention to provide a self-corrective workbook, which makes corrective procedures easier for preschool and kindergarten children. This is achieved by having the number of clips equal to the number of problems on the exercise page.

It is another object of the invention to provide children with child-friendly images, which appear during self-checking procedure. These images reinforce game-like feature and give them feeling of success and joy from learning.

It is another object of the invention to provide a time-saving workbook, which permits teachers at-a-glance to evaluate student understanding.

It is another object of the invention to provide a teacher with learning tool, which encourages group cooperation and teamwork.

It is another object of the invention to provide workbook, which easily adapts to different types of problems.

It is another object of the invention to provide workbook, which is reusable indefinitely.

Further objects and advantages of the invention such as to provide an educational device, which is economical and simple to produce, highly effective in use, and easy to understand and operate by children will be apparent from the description herein.

In accordance with certain of its aspects, this invention relates to a workbook for teaching preschool and kindergarten children, and older children with poor fine motor skills to practice and learn a particular subject, comprising:

a booklet having a plurality of exercise pages and an answer key page for each exercise page; each of said exercise pages including at least one problem and a plurality of selectable color-coded answers for each problem; said answer key page including a colored linear pattern consisting of a number of colored child-friendly images that appeal to said children, corresponding to the number of problems on said exercise page, such that the color of each image match the color of the correct answer on the exercise page; each of said images being numbered successively; and a separate flat answer card comprising:

a card having a plurality of notches and bumps, arranged near the top edge of said card such that the intervals from at least one of said notch and bump to the adjacent notch and bump correspond to the intervals from one of said colored images to the adjacent colored image on said linear colored pattern on said answer key page; each of said notches and bumps being numbered successively; and the additional notches and bumps, being arranged near at least on of the left, right and bottom edges of said card; and colored clips being removably fastened on said notches and bumps near the left, right, or bottom side of said card in storing position and removably fastened on notches and bumps near the top edge of said card upon completing exercises in a manner such that the upper part of said clip is visible above the top edge of the card; said clips having the same colors as the color-coding of proposed answers on the exercise page; the number of said clips being equal to the number of problems on said exercise page of said booklet;

whereby upon completion of the particular problem from the exercise page a clip of the color of the selected answer is fastened on the top edge of said card corresponding to the particular problem and correct and incorrect answers can be determined by aligning said colored linear pattern on said answer key page with the top edge of said answer card during checking the correctness of the answers.

"Child-friendly images" include "smiley faces", everyday familiar objects such as airplanes, trains and automobiles, farm and domestic animals, zoo animals, uniformed service people such as police, fire and postal workers, and so forth.

BRIEF DESCRIPTION OF THE DRAWINGS

The present invention may best be understood with reference to the following description, taken in connection with the accompanying drawings.

DETAILED DESCRIPTION OF THE INVENTION

Figure 1:
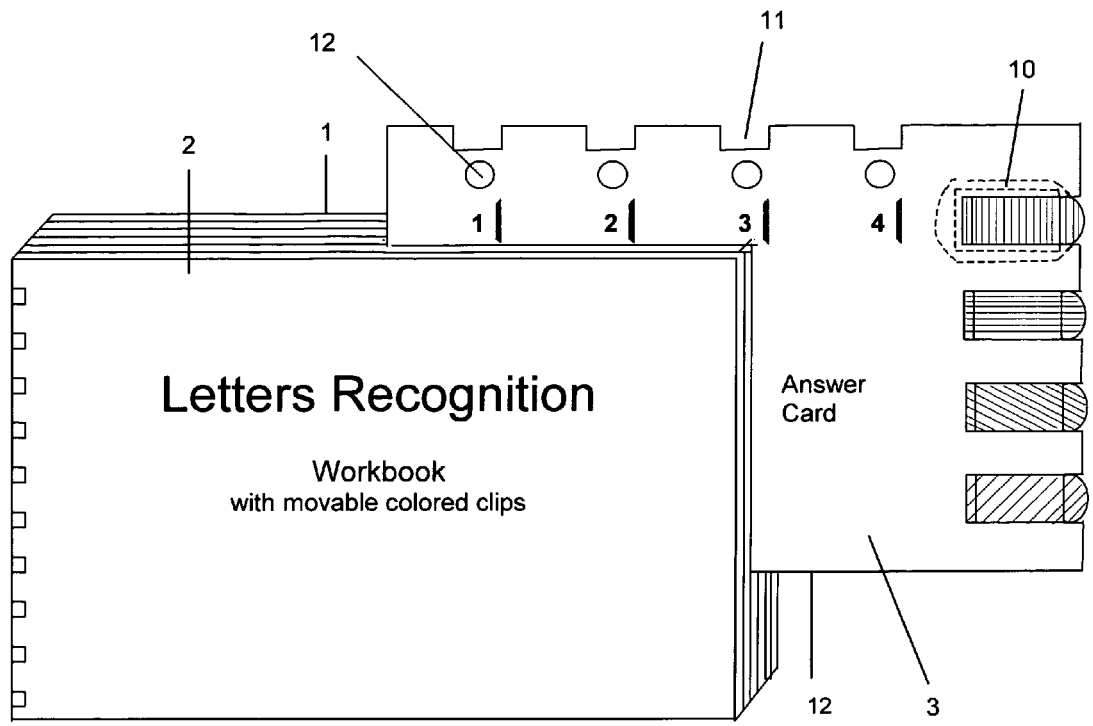
FIG. 1 is a reduced front elevation view of the booklet in a closed position and with the answer card inserted between pages.

Referring to FIG. 1, the workbook with movable colored clips 1, meaning the product a whole, contains a booklet 2, which is illustrated in a closed position. The booklet 2 has bound pages that can be turned and made to lie flat, and an answer card 3 that can be enclosed in the booklet and can serve as a bookmark.

Figure 2:
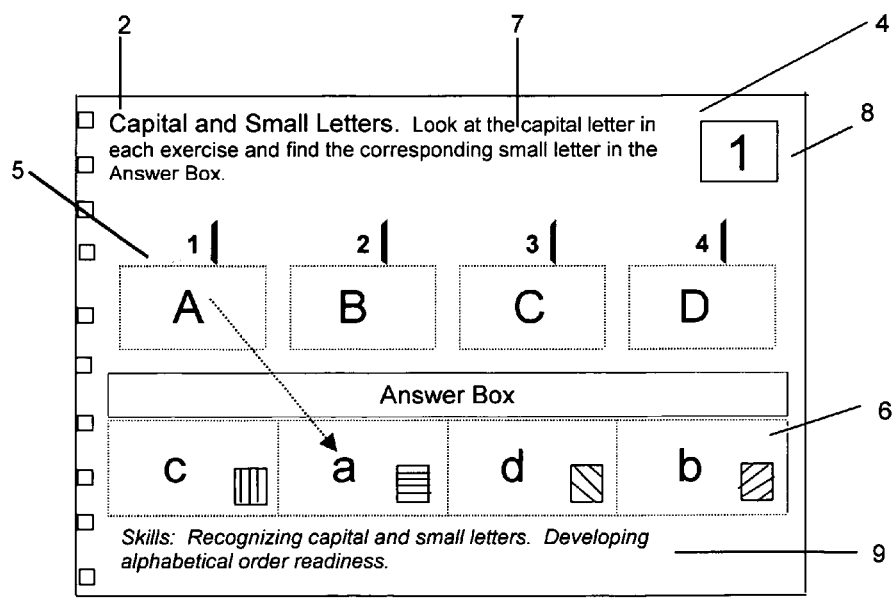
FIG. 2 is a front elevation view of a typical exercise page.
Figure 3:
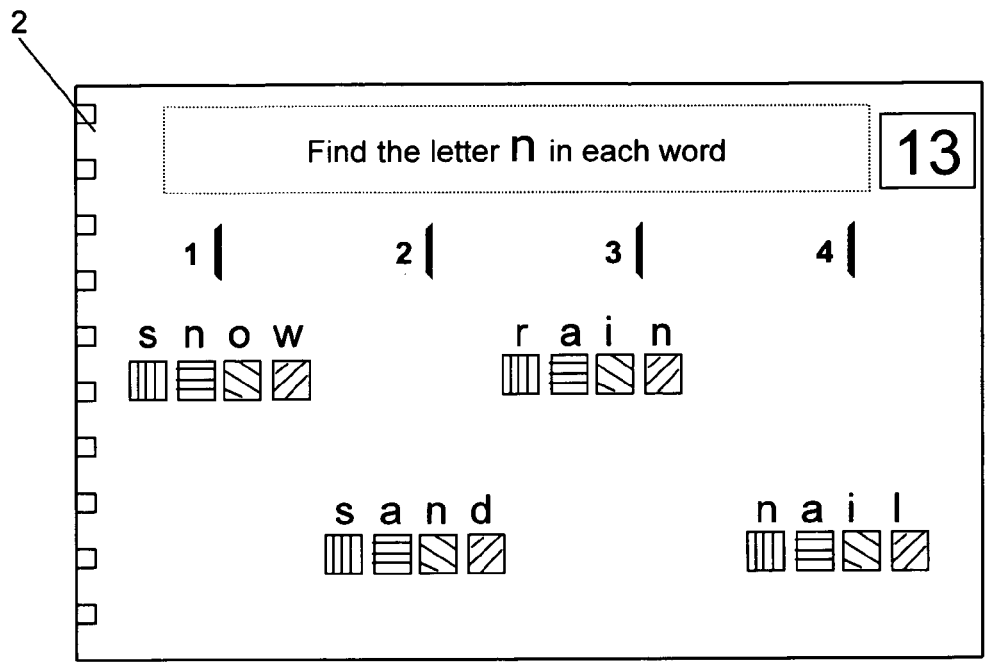
FIG. 3 is a front elevation view of a typical alternative exercise page.
Figure 4:
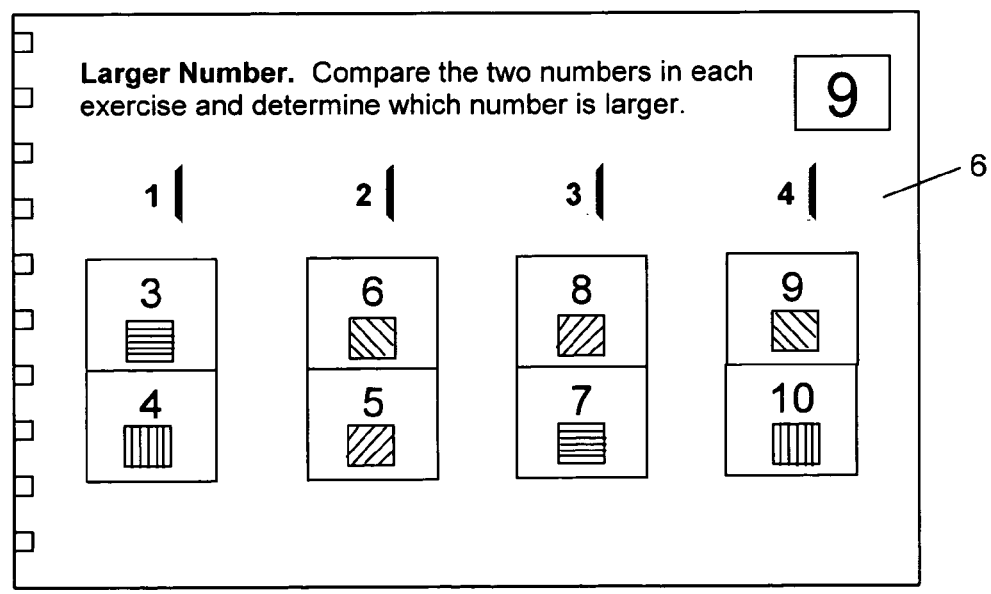
FIG. 4 is a front elevation view of another typical alternative exercise page.

Referring to FIG. 2, the booklet 2 contains a number of exercise pages one of which is illustrated as 4. Each of these pages 4 contains a section 5 with at least one but preferably multiple problems, a section 6 with color-coded selectable answers, a section 7 providing directions, and a section 8 indicating page number. The particular skills developed by the exercise page are identified in a line 9 at the bottom of the page. Referring to FIG. 2, the matching format of exercises offers four color-coded selectable answers to four problems. The colors indicated by hatching in the figure are used for coding of answers and typically are red, yellow, green, and blue. These four colors may be employed in different formats. FIG. 2, FIG. 3, and FIG. 4 show possible formats of exercises using these four colors. Modifications may be prepared with more than four colors associated with answers, for instance in addition to the four colors mentioned, orange, black, purple, and pink. In FIG. 2 and in the other figures color codes are illustrated as follows: red is represented by vertical lines, yellow is represented by horizontal lines, green is represented by diagonal lines, and blue is represented by diagonal lines of opposite orientation.

Referring again to FIG. 1, colored clips 10 are removably fastened to the right edge of the answer card. The clips 10 are colored to correspond to the colors of the selectable answers of section 6. The left, right, or bottom edges are intended for storing the clips when they are not being used. The upper edge of the answer card is intended for answering the problems on each exercise page. The clips typically measure about 2.00 inches to about 1.50 inches in size, preferably about 1.00× 1.25 inches, to facilitate handling by young children. The storing and answering edges of the answer card have the notches 11 for reliable horizontal fixation and bumps 12 for vertical fixation of the clips.

Figure 5:
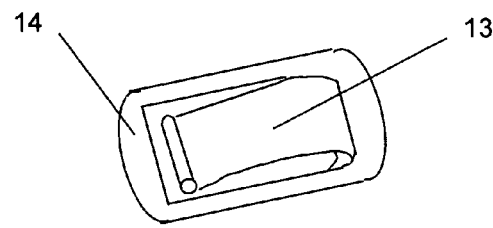
FIG. 5 is a front elevation view of the clip in enlarged form.

Referring to FIG. 5, each colored clip 10 has rectangular form and has a front board 13 and a rear board 14. This clip 10 is designed so that the front board creates the sufficient colored spot on the answer card and is partially visible above the edges of the answer card.

Figure 6:
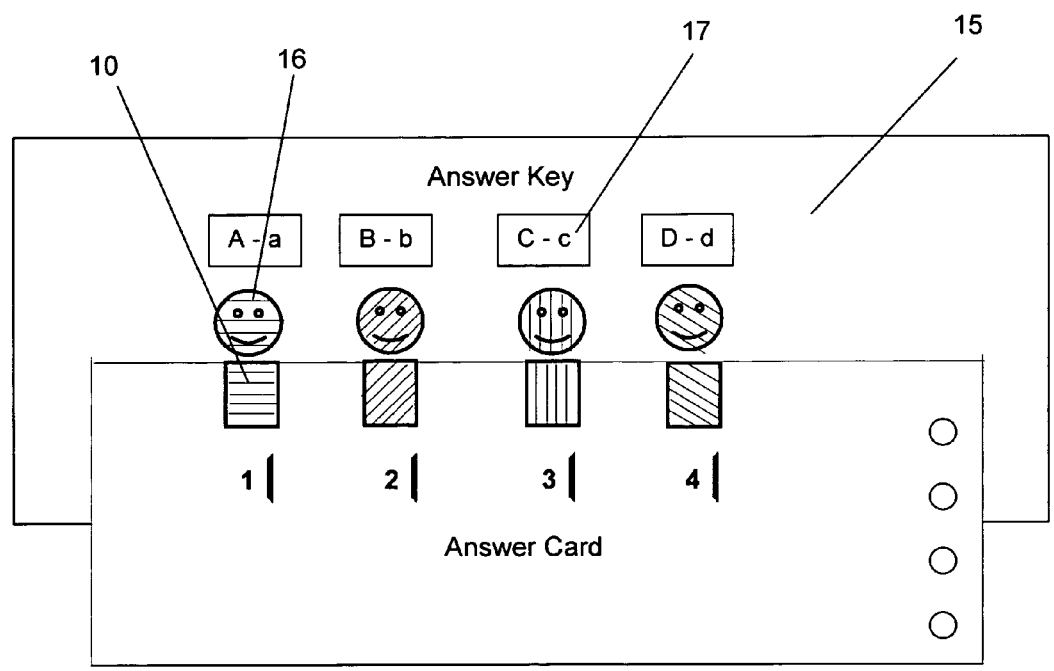
FIG. 6 is a partial front elevation view of the answer card resting against the color-coded answer key.

Referring to FIG. 6, the booklet contains a number of answer key pages 15, typically on the back of the exercise page, each of which has two sections. On the bottom there is an answer key presented in a color-coded form 16, and above there is an answer key in written form 17 for verification and reinforcement skills. The color-coded answer key 16 takes the form of the row of happy smiling faces.

Figure 7:
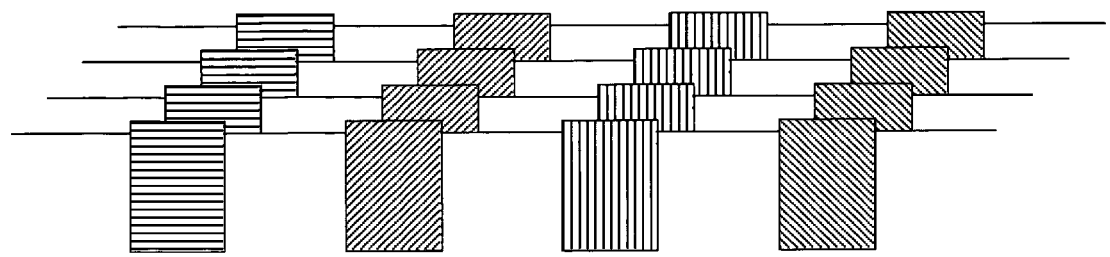
FIG. 7 is a partial front elevation view of a stack of answer cards.

Referring to FIG. 2 and to FIG. 7, the answer recording technique has the following steps. The student works out each problem, selects an appropriate clip, and places it in the proper position. For example, problem 1 requires the student to recognize the small letter corresponding to the capital letter "A." The student looks at the small letter "a" in the answer Box, chooses the appropriated clip (in this case yellow), takes off a yellow clip from the right edge of the answer card, and places this clip into the first position on the answer card. The student then answers the rest of the problems on the page in the same manner.

Referring to FIG. 6, the answer-checking and correcting technique has the following steps. When the student has completed all the problems on a page, he or she should turn over the page and put the answer card below the color-coded answer key (under smiling faces). The student compares the responses to the colors of answer key. If the colors are the same, the answer is correct. If the colors are different, the student takes off the wrong clips, turns the page back and looks at the problem again on the exercise page to find the correct answer and puts the correct clip into corresponding position. For better memorizing he/she can refer to the question-answer form above smiling faces.

The lesson is completed when all the clips match the colors of the preprinted color-coded answer key. When children see that all their answers are correct, they feel a great sense of accomplishment that reinforces the desire to learn and increases their self-confidence. Before the student begins the exercise on the next page, he/she should place clips on the right edge of the answer card to start again.

As illustrated in FIG. 7, in the classroom the teacher may use these workbooks as a timesaving procedure for evaluating group or class understanding at a glance. Before the students start to check and correct the exercise, the teacher can combine all answer cards of a group of students and stack them together with the answer key card containing all the correct answers. These cards create a comprehensive colored display of class or group understanding.

It is apparent to those skilled in the art that the workbook described can be further adapted within the scope of the invention.

The invention claimed is:

1. A workbook with movable colored clips for teaching preschool and kindergarten children, and older children with poor fine motor skills to practice and learn a particular subject, comprising:

a booklet having a plurality of exercise pages and an answer key page for each exercise page; each of said exercise pages including at least one problem and a plurality of selectable color-coded answers for each problem; said answer key page including a colored linear pattern consisting of a number of colored child-friendly images that appeal to said children, corresponding to the number of problems on said exercise page, such that the color of each image matches the color of the correct answer on the exercise page; each of said images being numbered successively; and a separate flat answer card comprising:

a card having a plurality of notches and bumps, arranged near the top edge of said card such that the intervals from at least one of said notch and bump to the adjacent notch and bump correspond to the intervals from one of said colored images to the adjacent colored image on said linear colored pattern on said answer key page; each of said notches and bumps being numbered successively; and said notches and bumps, being arranged near at least on of the left, right and bottom edges of said card; and colored clips that preschool and kindergarten children and older children with poor fine motor skills can manipulate to provide an exact fixation of said work pieces in storing and answering positions on said answer card, said colored clips being flat, and having rectangular form with a front board and a rear board such that when said front board is placed on said answer card a sufficient colored spot is created on said answer card that is partially visible above the edges of said answer card, said colored clips being removably fastened on said notches and bumps near the left, right, or bottom side of said card in storing position and removably fastened on notches and bumps near the top edge of said card upon completing exercises in a manner such that preschool and kindergarten children and older children with poor fine motor skills are able to provide an exact fixation of said work pieces in storing and answering positions on the answer card with the upper part of said clip being visible above the top edge of the card;

said clips having the same colors as the color-coding of proposed answers on the exercise page; the number of said clips being equal to the number of problems on said exercise page of said booklet;

whereby upon completion of the particular problem from the exercise page a clip of the color of the selected answer is fastened on the top edge of said card corresponding to the particular problem and correct and incorrect answers can be determined by aligning said colored linear pattern on said answer key page with the top edge of said answer card during checking the correctness of the answers.

2. The workbook according to claim 1, wherein said answer card is rigid and suitable for clips sliding.

3. The workbook according to claim 1, wherein said notches are present and are arranged near the top, left, right, and bottom edges of said answer card and said notches have the width equal to the width of the front surface of said colored clip.

4. The workbook according to claim 1, wherein said bumps are arranged near the top edge are colorless and bumps arranged near the left, right, and bottom edge match the colors of storing clips.

5. The workbook according to claim 1, wherein said flat clips have visible colored front surface and rear surface and can be partially visible above the top edge of the answer card.

6. The workbook according to claim 1, wherein said clips are about 1.00 inch to about 1.50 inches in size.

7. The workbook according to claim 1, wherein said clips are about 1.00 inch to about 1.25 inches in size.

* * * * *